(12) United States Patent
Moshrefzadeh et al.

(10) Patent No.: US 6,391,528 B1
(45) Date of Patent: May 21, 2002

(54) METHODS OF MAKING WIRE GRID OPTICAL ELEMENTS BY PREFERENTIAL DEPOSITION OF MATERIAL ON A SUBSTRATE

(75) Inventors: Robert S. Moshrefzadeh, Oakdale; Patrick A. Thomas, Maplewood, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/542,256

(22) Filed: Apr. 3, 2000

(51) Int. Cl.$^7$ .............................. G02B 5/30; G02B 5/10; H01L 21/205
(52) U.S. Cl. .................. 430/321; 430/1; 430/2; 117/92; 216/24; 359/486; 359/569; 427/584; 427/582; 427/586; 427/555
(58) Field of Search ................ 430/321, 1, 2; 359/576, 486, 569, 613; 427/586, 163.1, 584, 555, 166, 582; 216/24; 117/92

(56) References Cited

U.S. PATENT DOCUMENTS

| 3,833,383 A | * | 9/1974 | Ryan et al. ...................... 430/1 |
| 4,049,944 A | | 9/1977 | Garvin et al. ......... 219/121 EM |
| 4,289,381 A | | 9/1981 | Garvin et al. ................ 350/320 |
| 4,340,617 A | * | 7/1982 | Deutsch et al. ............. 427/53.1 |
| 4,489,102 A | * | 12/1984 | Olmer et al. ................ 427/54.1 |
| 4,512,638 A | | 4/1985 | Sriram et al. ................ 350/372 |
| 4,514,479 A | | 4/1985 | Ferrante ....................... 430/2 |
| 4,523,807 A | | 6/1985 | Suzuki et al. ................ 350/128 |
| 4,664,940 A | | 5/1987 | Bensoussan et al. ....... 427/53.1 |
| 4,746,934 A | | 5/1988 | Schoening ................... 346/110 |
| 4,778,744 A | * | 10/1988 | Borrelli et al. .............. 430/290 |
| 4,818,661 A | * | 4/1989 | Taylor et al. ................ 430/320 |
| 4,843,031 A | * | 6/1989 | Ban et al. ..................... 437/129 |
| 4,857,425 A | | 8/1989 | Phillips .......................... 430/1 |
| 4,859,496 A | | 8/1989 | Toyonago et al. .......... 427/53.1 |
| 4,859,548 A | * | 8/1989 | Heise et al. ................ 430/320 |
| 5,250,329 A | | 10/1993 | Miracky et al. ............. 427/556 |

(List continued on next page.)

FOREIGN PATENT DOCUMENTS

| EP | 0 903 597 A2 | 3/1999 | ............ G02B/6/16 |
| JP | 60 230102 | 11/1985 | |
| JP | 63-060587 | * 3/1988 | |
| JP | 5036656 A | 2/1993 | |
| JP | 07020766 | 1/1995 | ............ G03H/1/08 |
| JP | 09304750 | 11/1997 | ............. G02F/1/13 |
| JP | 10078415 | 3/1998 | ........... G01N/29/00 |
| JP | 11204439 A | 7/1999 | |
| JP | 11345773 A | 12/1999 | |

OTHER PUBLICATIONS

Kodas et al., "Surface Temperature Rise Induced By A Focused Laser Beam. Application To Laser–Induced Chemical Vapor Deposition." *Mat. Res. Soc. Symp. Proc.* vol. 75 1987 Materials Research Society, pp. 57–63.

Research Disclosure, "Laser Chemical Vapor Deposition of Silver," Mar. 1986, 26343, New York, NY, pp. 146.

Christensen et al., "Chemical Vapor Deposition Of Silicon Using A $CO_2$ Laser," *Appl. Phys. Lett.* 32(4), Feb. 15, 1978, pp. 254–256.

(List continued on next page.)

Primary Examiner—Martin Angebranndt
(74) Attorney, Agent, or Firm—Robert J. Pechman

(57) ABSTRACT

A method for making wire grid optical elements by preferentially depositing material on a substrate is disclosed. Material can be preferentially deposited by directing an electromagnetic interference pattern on to a substrate to selectively heat areas of the substrate coincident with the interference pattern maxima. The substrate can then be exposed to gas phase material that is capable of preferentially accumulating on surfaces based on surface temperature.

4 Claims, 2 Drawing Sheets

U.S. PATENT DOCUMENTS

| | | | | |
|---|---|---|---|---|
| 5,543,251 A | * | 8/1996 | Taylor | 430/1 |
| 5,745,221 A | | 4/1998 | Nishikawa et al. | 355/71 |
| 5,748,368 A | | 5/1998 | Tamada et al. | 359/486 |
| 5,771,098 A | | 6/1998 | Ghosh et al. | 356/363 |
| 5,796,004 A | * | 8/1998 | Nakaso et al. | 73/643 |
| 5,810,945 A | | 9/1998 | Stutzmann et al. | 156/643.1 |
| RE36,113 E | * | 2/1999 | Brueck et al. | 430/1 |
| 5,955,221 A | | 9/1999 | Sanders et al. | 430/2 |
| 5,991,075 A | | 11/1999 | Katsuragawa et al. | 357/48 |

OTHER PUBLICATIONS

Allen, "Laser Chemical Vapor Deposition: A Technique For Selective Area Deposition," *J. Appl. Phys.* 52(11), Nov. 1981, pp. 6501–6505.

Terrill et al., "Laser Chemical Vapor Deposition For Microelectronics Production," 0–7803–4311–5/98, ©1998 IEEE, pp. 377–382.

Foulon et al., "Laser Direct–Write Al Deposition On Si, GaAs And Diamond From Trialkylamine–Alane Precursors," *Applied Surface Science* 69 (1993), pp. 87–93.

Translations of JP 11–204439.

Translation of JP 11–345773.

* cited by examiner

METHODS OF MAKING WIRE GRID OPTICAL ELEMENTS BY PREFERENTIAL DEPOSITION OF MATERIAL ON A SUBSTRATE

The present invention relates generally to methods of patterning by preferential deposition of material according to an interference pattern directed onto a substrate, and to articles made by the method.

BACKGROUND

Many techniques have been developed for patterning deposited material on a substrate. A large number of these techniques involve the use of masks to create the desired pattern. For example, material can be deposited over a mask on a substrate. The mask can then be removed, leaving material on those portions of the substrate that were left exposed by the mask. Other techniques involve forming a uniform coating of material, placing a mask over the coating, etching the portions of the coating exposed by the mask, and removing the mask. In many cases, and especially in situations where the pattern dimensions are small, the mask is made by photolithographic techniques. Photolithography typically entails coating a photoresist layer, selectively exposing the photoresist to light, developing the photoresist, and removing the developed (or undeveloped) portions of the photoresist. These steps create the mask. Including the mask-making steps, mask-based patterning techniques typically require many processing steps, each of which can be time consuming.

SUMMARY OF THE INVENTION

The present invention provides methods of patterning materials on a substrate, for example to form wire grid type reflectors and/or polarizers or other optical elements. The present invention involves selectively heating a substrate according to the maxima and minima of an interference pattern directed onto the substrate. Material can be preferentially deposited on the substrate based on the temperature differences created by the interference pattern. Methods of the present invention can be used to selectively deposit materials without the use of a mask. Methods of the present invention can also be used to pattern substrates in just a few, or even in one, steps. Methods of the present invention can also be used to deposit superimposed patterned structures on the same substrate by either serially or simultaneously depositing material according to different interference patterns.

In one aspect, the present invention provides a method for preferentially depositing material on a substrate surface to make a wire grid optical element, which includes the steps of directing an electromagnetic interference pattern onto the substrate surface to preferentially heat selected portions of the substrate surface according to the interference pattern, and selectively depositing conductive material on the substrate surface according to the interference pattern by exposing the substrate to the conductive material in the gas phase, the material capable of preferentially accumulating as a function of surface temperature.

In some embodiments, mutually coherent beams can be overlapped on the substrate surface to form the interference pattern, and material can be deposited to form structures having dimensions roughly determined by the dimensions of the interference pattern. In these embodiments, structures that have dimensions and/or spacings that are smaller than the spot size of the overlapped beams can be deposited on the substrate without using a mask.

DETAILED DESCRIPTION

Methods of the present invention pertain to preferentially depositing material on a substrate. These methods generally involve heating selected areas of a substrate by directing an interference pattern of electromagnetic radiation onto the substrate. High intensity regions of the interference pattern can locally heat the substrate whereas areas of the substrate corresponding to low intensity regions of the interference pattern can remain relatively cooler. Accordingly, a surface temperature profile can be created that generally corresponds to the interference pattern. That is, higher temperature areas generally correspond to high intensity regions of the interference pattern and lower temperature areas generally correspond to low intensity regions of the interference pattern.

Wire grid optical elements can be made by selective deposition according to the temperature profile set up by the interference pattern. Selective deposition generally involves exposing the substrate to gas phase material capable of preferentially accumulating on the surface as a function of the surface temperature differences within the temperature profile created by the interference pattern. For example, material that has a sticking coefficient that varies with temperature over the range of temperatures created by the interference pattern can be vapor deposited on the substrate. As another example, a reactive gas can be used (such as those reactive gasses useful in chemical vapor deposition processes) that has a temperature threshold for reaction and material deposition that lies between the highest and lowest surface temperatures within the temperature profile created by the interference pattern.

By heating the substrate according to an electromagnetic interference pattern, various periodic, repeating, or other multiple structures can be selectively deposited on the substrate, whereby the lateral dimensions and/or spacings of the structures are smaller than the spot size of the electromagnetic radiation. This distinguishes from conventional laser chemical vapor deposition (LCVD) processes where the lateral dimensions of deposited structures roughly corresponds to laser spot size. Patterned structures can thus be directly deposited having spacings that are quite small, for example less than a wavelength of visible light. This can be particularly useful in making wire grid optical elements.

Figure 1:
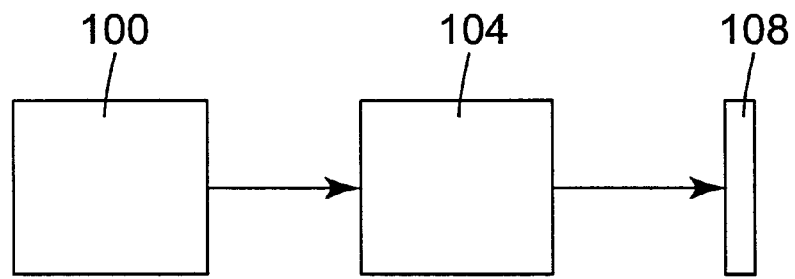
FIG. 1 schematically shows elements in a system for performing a method of the present invention.

Components that can be included in a system useful in performing methods of the present invention are schematically depicted in FIG. 1. The system can include an electromagnetic radiation source 100, an interference pattern generating means 104, and a substrate 108. Typically, at least the substrate is contained in a vacuum chamber, or other deposition chamber, for exposure to the deposition material. Other components of the system can reside in the deposition chamber or outside the deposition chamber. Generally, the radiation source remains outside the deposition chamber.

Depending on the configuration of the system, interference pattern generating means 104 can be remote from substrate 108 or coincident with the surface of substrate 108. For example, if a diffraction grating is used as the interference pattern generating means, it might typically be positioned at a distance from the substrate 108, and between the radiation source 100 and the substrate 108. If mutually coherent beams are overlapped as the interference pattern generating means, the overlapping will generally take place at least at the surface of the substrate.

Depending on the configuration, various optical components such as lenses, apertures, beam splitters, slits, gratings, mirrors, filters, other such components or combinations thereof can be positioned between the radiation source 100 and the interference pattern generating means 104. In a similar manner, various optical components can be positioned between interference pattern generating means 104 and substrate 108, such as in those configurations where the interference pattern generating means is not coincident with the substrate surface.

Radiation source 100 can be any suitable source that produces electromagnetic radiation capable of forming an interference pattern that can be used to selectively heat the surface of a substrate. Suitable sources include lasers, lamps, electron beams, ion beams, and the like. Exemplary radiation sources include monochromatic sources or sources that emit radiation over a relatively narrow wavelength band. Radiation sources that emit multiple wavelengths or multiple resolved wavelength bands many also be used. Lasers can be particularly useful. Laser sources can provide a source of coherent, collimated light with sufficient intensity to heat areas of a substrate. Laser radiation may be continuous or pulsed as desired for a particular application.

The choice of a particular type of radiation source, including the wavelength of the incident radiation, the intensity of the incident radiation, and other such characteristics, can depend on the method of forming the interference pattern, the type of substrate being used for deposition, the material being deposited, the deposition method, and the dimensions, spacings, and shapes of the structures to be deposited on the substrate. For example, an ultraviolet laser such as an excimer laser might be a suitable choice for selectively heating a glass substrate. In general, lasers can be a particularly suitable choice for systems where the interference pattern is to be generated by overlapping two or more mutually coherent beams at the substrate surface. For these systems, beam splitters and/or mirrors can be used in the optical path to split the laser into two or more mutually coherent beams that can be suitably overlapped at the substrate surface.

Referring again to FIG. 1, interference pattern generating means 104 can be any suitable optical component, combination of optical components, or any suitable methodology for forming an electromagnetic interference pattern. For example, as discussed above, a laser beam can be split and recombined at a substrate surface. The wavelength or wavelengths of the incident radiation and the angle between the two beams as they are overlapped at the substrate surface can be used to determine the interference fringe pattern formed at the surface. Multiple beam splitters can be used to create more than two mutually coherent beams. For example, four mutually coherent beams can be generated and suitably overlapped to create a two-dimensional interference pattern (such as a grid or a pattern of dots). Slits, diffraction gratings, and the like can also be used to form interference patterns. In the case of slits and diffraction gratings, a single beam can be used to form an interference pattern that can then be projected onto the substrate surface, for example by a series of lenses.

Various optical components can be disposed between the electromagnetic radiation source and the interference pattern generating means. For example, beam splitters can be used to form multiple similar beams, mirrors can be used to redirect beams, apertures can be used to shape beam cross-sections, and lenses can be used to focus beams, expand beams, and shape beam profiles. Various combinations of these and other optical components can be used.

Referring again to FIG. 1, substrate 108 can include any substrate having a surface that is capable of being heated by the selected incident radiation. Useful substrates can include those that include one or more of the following characteristics: glass, plastic, metal, inorganic, organic, plate-like, film-like, rigid, flexible, visibly opaque, visibly transparent, and other such characteristics or suitable combinations thereof. Substrates having native surfaces that might not otherwise adequately absorb incident radiation can be coated with one or more layers of material to form a surface that can be adequately heated by the incident radiation. For example, a metal layer can be coated onto a glass substrate to increase the ability for the substrate to absorb incident radiation. However, glass substrates may adequately absorb incident radiation even without having extra layers, for example when ultraviolet light is used to form the interference pattern.

As mentioned, various substrate constructions can be used. Typically, the substrate will include one or more layers of the same or different materials and will be in the form of a rigid or semi-rigid plate or a flexible or semi-flexible film. The type of substrate materials and constructions used can depend on compatibility with the radiation used to form the interference pattern, compatibility with deposited material, compatibility with any pre- or post-deposition processes (such as heating steps, radiating steps, coating steps, etching steps, plating steps, and the like), and compatibility with end-use applications. For example, substrates transparent to visible light may be selected as substrates for preferential deposition according to the present invention when the intended end use of the pattern includes wire grid optical elements that transmit at least a portion of visible light.

It may also be desired to dispose an antireflective coating on one or both sides of the substrate, typically before preferential deposition. For example, when methods of the present invention are used to make visible light polarizing wire grid optical elements, disposing an antireflective coating on the substrate can increase the amount of light transmitted by the element.

Because the size and pitch of the interference pattern can be quite small, it may be advantageous to use substrates that have in-plane thermal conductivities low enough to maintain temperature differences between regions exposed to interference pattern maxima and regions exposed to interference pattern minima that are sufficient to allow preferential accumulation of material according to the interference pattern. It may also be useful to employ substrates that have higher thermal conductivities through the thickness of the substrate (z-axis) as compared to the in-plane thermal conductivity at the surface of the substrate. Higher z-axis thermal conductivities as compared to in-plane thermal conductivities can promote heat transfer through the substrate rather than to adjacent, cooler regions on the surface of the substrate. This can help maintain the temperature profile created by the interference pattern. It may also be useful to employ substrates that have anisotropic thermal conductivities in the plane of the substrate at the surface of the substrate. For example, when linear structures are being deposited coincident with a linear interference fringe pattern, it may be useful to employ substrates with anisotropic in-plane thermal conductivities and to align the high thermal conductivity direction with the interference pattern fringe direction.

According to methods of the present invention, materials can be preferentially deposited onto regions of the substrate according to the interference pattern directed onto the substrate. Suitable deposition methods include any method whereby material can be preferentially accumulated on the substrate surface as a function of surface temperature for temperatures within the range created by the interference pattern. Materials that can be deposited include any material that can be condensed in a temperature-dependent manner onto a surface to form a film or layer. Particularly suited materials include metals (e.g., copper, gold, silver, aluminum, nickel, platinum), metal alloys, metal oxides, metal sulfides, semi-metals (e.g., carbon, silicon, germanium), semi-metal oxides, and other such materials and combinations thereof.

One deposition method that can be suitable for preferentially depositing material in methods of the present invention is laser chemical vapor deposition (LCVD). LCVD generally involves exposing a substrate to a reactive gas while exposing a portion of the substrate to a laser beam. The laser beam heats the exposed portion of the substrate above a threshold temperature at which the reactive gas can react, leaving material deposited on the surface from the gas phase. LCVD has been used to "write" metallic lines on a substrate, for example, by moving the laser beam along a path on the substrate surface. The width of the metallic line roughly corresponds to the diameter of the laser spot at the surface.

Figure 2:
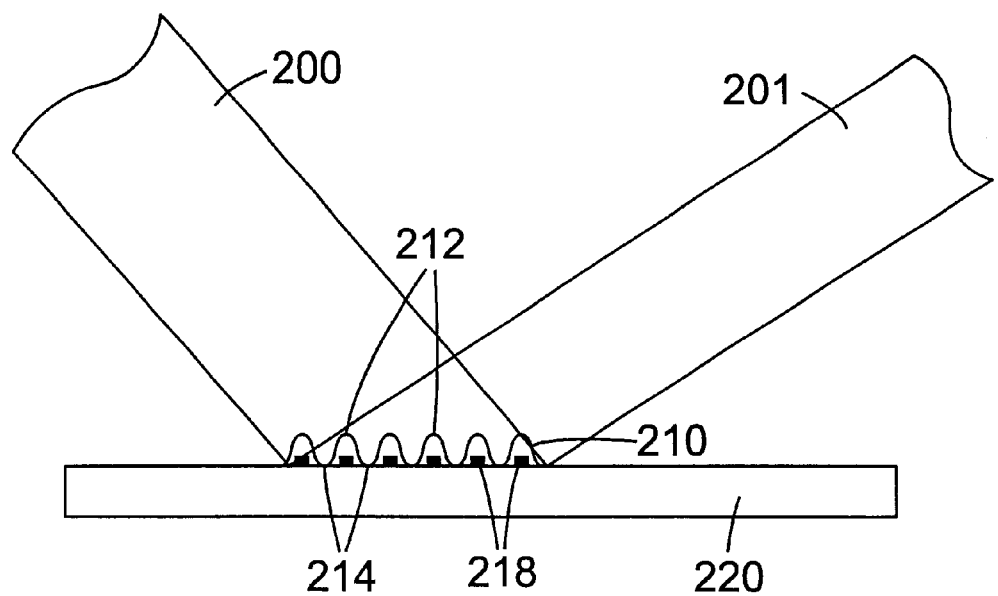
FIG. 2 schematically shows preferential deposition according to one embodiment of the present invention.

In methods of the present invention, an electromagnetic interference pattern can be used to preferentially heat areas of the substrate according to the interference pattern. The interference pattern can include features (e.g., lines, dots, grids, etc.) that have dimensions that are smaller than the spot size of the incident radiation on the substrate. The interference pattern can be used to create hotter and cooler areas on the substrate, as discussed above. Using an appropriate reactive gas, material can preferentially react and accumulate at the hotter areas created by the interference pattern directed onto the substrate. FIG. 2 illustrates this concept. FIG. 2 schematically shows two mutually coherent electromagnetic beams 200 and 201 overlapping on the surface of substrate 220 to form interference pattern 210. The interference pattern 210 is characterized by a series of maxima 212 and minima 214 in intensity. The interference pattern can set up a surface temperature profile that has a similar series of local temperature maxima and minima. Under suitable conditions, the threshold temperature at which chemical vapor deposition can occur can lie between the local temperature maxima and local temperature minima. Deposited material 218 can thus preferentially accumulate in those regions where the temperature exceeds the threshold temperature.

More conventional deposition methods can also be used in the present invention. For example, physical vapor deposition techniques can be used to deposit material. Generally, physical vapor deposition involves the condensing of material from the gas phase on surfaces with rates of accumulation that are typically faster on cooler surfaces than on hotter surfaces. In the present invention, material can be condensed onto the area of the substrate irradiated with the interference pattern, preferentially accumulating on the cooler regions in that area.

Deposition methods other than physical vapor deposition and chemical vapor deposition can also be used that result in material being preferentially accumulated according to the interference pattern directed onto the surface of the substrate. Exemplary deposition methods include those where conductive material can be preferentially deposited according to surface temperature differences to form wire grid optical elements.

Figure 3A:
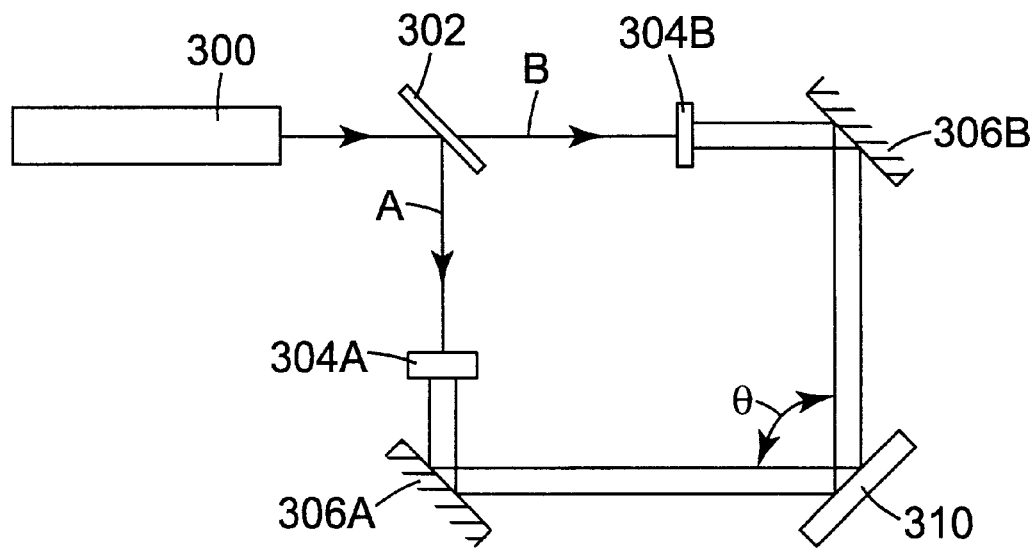
FIG. 3(a) schematically shows a system for forming an interference pattern on a substrate.

As discussed above, interference patterns can be generated in a variety of ways. An exemplary manner is by overlapping two or more mutually coherent electromagnetic beams, such as laser beams, on the substrate surface. Mutually coherent beams can be generated, for example, by splitting a laser beam using one or more beam splitters and then recombining the beams at the substrate surface. FIG. 3(a) schematically shows a system where a beam from a laser 300 is split by beam splitter 302 into two beams, labeled A and B. Beam A can follow an optical path where it is expanded by optional lens 304A, redirected by optional mirror 306A and directed onto substrate 310. Other optical components can optionally be used in the optical path of beam A, as discussed above. Beam B can likewise follow an optical path where it is expanded by optional lens 304B, redirected by optional mirror 306B and directed onto substrate 310. Beams A and B are directed onto substrate 310 so that they overlap in an area on the surface. The spacing of the interference pattern on the substrate surface can be determined by the angle θ between beams A and B as they overlap at the substrate surface and the wavelength of the beams.

Overlapping mutually coherent beams to form an interference pattern can be quite sensitive to small changes in position or angle of the substrate. It is thus preferred that the substrate remain in a fixed position relative to the rest of the optical system during exposure. It is also preferred that care is taken to adequately isolate the system from vibrations that can alter the interference pattern during exposure.

Interference fringes formed by overlapping mutually coherent beams can also be quite sensitive to small height variations on the substrate surface. In some applications, it may be preferred to minimize the surface roughness of the substrate. In other applications, it may be desired to utilize surface contours (whether those contours are designed or unintended) to alter the positions or shapes of the interference fringes on the surface.

Figure 3B:
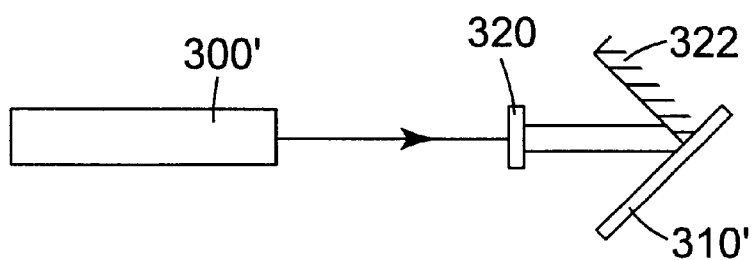
FIG. 3(b) schematically shows another system for forming an interference pattern on a substrate.

Another way of overlapping mutually coherent electromagnetic beams is by placing one or more mirrors at angles with the substrate surface in positions so that a portion of a laser beam, for example, is incident on the one or more mirrors and another portion of the laser beam is incident directly on the substrate. This concept is illustrated in FIG. 3(b). Here a laser 300' produces a beam that can optionally be expanded by lens 320, reshaped by one or more apertures (not shown), redirected by mirrors (not shown), and the like. The beam is then directed toward substrate 310' and mirror 322. Mirror 322 is positioned and oriented so a portion of the beam is incident on the mirror and reflected onto the substrate, and so that a portion of the beam is incident directly on the substrate. The two portions of the beam overlap and form an interference pattern on the substrate surface. As with the beam splitter system above, the dimensions of the interference pattern can be determined by the angle between the beam portions during overlap and the wavelength of the beams.

Other means of forming interference patterns include projecting a remotely generated interference pattern onto the substrate. For example, an interference pattern may be formed by diffracting one or more light beams and then suitably projecting the fringes onto the substrate. In this case, the dimensions of the interference pattern at the surface of the substrate depend on the diffraction grating and any magnification, demagnification, distortion, filtering, or other alteration of the interference pattern size or shape before reaching the substrate.

Two or more sets of interference patterns having different pitches and/or different patterns and/or orientations can be directed onto the same substrate either simultaneously or serially. This can allow structures deposited according to different patterns to be formed serially or simultaneously on the same substrate. This can be accomplished by using two or more radiation sources, or sets of radiation sources, each having a different wavelength, or by using one or more radiation sources that each emit more than one wavelength.

Interference patterns can also be modified by the use of lenses and/or apertures in the optical path. For example, a chirped interference pattern can be obtained by using cylindrical lenses. Chirped interference patterns are those that have fringe spacings that vary, for example where the spacing between fringes becomes smaller with each successive fringe. Curved interference fringes can be obtained by using spherical lenses. For example, a spherical lens can be used to create an interference pattern that comprises a series of arc-shaped fringes each spaced a uniform distance apart. Other optical components can also be used to alter the fringe shape, size, orientation, spacing, etc. of the interference pattern.

As discussed, methods of the present invention can be used to preferentially deposit material on a substrate to form structures useful for wire grid optical elements that have dimensions corresponding to an interference pattern directed onto the substrate. The deposited structures can include a series of evenly spaced parallel lines, a series of parallel lines with varying pitch, a series of curved lines, a grid pattern (e.g., crosshatched pattern), a pattern of dots, or other combinations of patterns that can be formed on a surface by one interference pattern or by two or more overlapped or superimposed interference patterns. The structures can also be made having symmetric or asymmetric cross-sectional profiles as discussed further below).

After preferential deposition according to methods of the present invention, other steps may be performed to form a desired article or device. For example, etch back steps and/or further deposition steps may be performed. Preferential deposition may result in some material accumulating in undesired areas of the substrate, although in lesser amounts compared to the material accumulated in desired locations. In such cases, an etch back step can be performed, for example to uniformly reduce the thickness of the deposited material across the substrate. Etch back can be performed to reduce the amount of, or to completely remove, the material accumulated in undesired areas while keeping sufficient deposited material in the desired regions. In a similar way, an etching step can be used to etch the underlying substrate, or layers disposed thereon, while the preferentially accumulated material on the substrate acts as an etch mask. The preferentially accumulated material can then remain on the substrate or be removed to reveal a patterned substrate.

The preferentially accumulated material might also be used as a template for further deposition. For example, a relatively small amount of conductive material might be deposited on a substrate according to an interference pattern. Then, the patterned conductive material can be used as a seed layer for electroplating to form a thicker pattern of conductive material. Post-preferential deposition steps such as etch back steps and further deposition steps can also be combined to achieve desired results. It may also be desirable to perform additional preferential deposition steps using the same interference pattern to pattern layered structures using different materials. For example, an insulative layer such as an oxide can be deposited according to an interference pattern, followed by depositing a metal according to the same interference pattern on top of the oxide. Other similar procedures or variations thereof can also be used to form overlapped patterns, layered structures, or more complicated shapes and patterns.

Methods of the present invention can be used to make patterns for many different applications. One advantage of the preferential accumulation methods of the present invention is that it is possible to form patterns of material on a substrate surface where the dimensions and/or spacings of the patterned regions are much smaller than the spot size of the laser or other form of electromagnetic radiation. Additionally, structure spacings can be made smaller than wavelengths of visible light, for example. Because interference pattern dimensions can be on the order of, or smaller than, wavelengths of visible light, patterns made according to methods of the present invention can be especially useful in many optical applications including, but not limited to, wire grid optical elements such as wire grid polarizers, wire grid reflectors, and combinations thereof. Other optical elements can also be made such as diffraction gratings, optical sieves, and the like. Patterning methods of the present invention can also be used as intermediate structures in a process, such as when the structures are used as etch masks and/or seed layers as discussed above.

Wire grid reflectors and/or polarizers can be made using methods of the present invention. For example, a periodic array of parallel metallic lines can be formed on a substrate to make a wire grid polarizer. The theory of wire grid polarizers is well known. In general, when unpolarized light is incident on a wire grid polarizer that has a periodic array of parallel conductive wires, the wire grid will reflect light polarized parallel to the wires and transmit light polarized perpendicular to the wires. This condition generally holds for wavelengths of light that are much greater than the spacing between the wires (the condition has often been stated as $\lambda/5 \geq d$ where $\lambda$ represents the affected wavelengths and d is the wire spacing). Wire grid reflectors can be made by forming two sets of parallel lines on the substrate surface, the sets of parallel lines typically being mutually orthogonal.

Useful devices can be made by combining wire grid polarizers with wire grid reflectors. For example, a square wire grid reflector pattern can be deposited with dimensions to reflect infrared radiation (e.g., using wire spacings of about 200 to 500 nm or more). On the same substrate, a linear wire grid pattern can be formed that acts as reflective polarizer to a wavelength range in the visible spectrum (e.g., using wire spacings of about 50 to 100 nm or less). Such superimposed structures can be used to combine visible light polarizing functions with heat shielding.

As mentioned above, cross-sectional profiles of structures preferentially deposited on a substrate according to the present invention can be symmetric or asymmetric. Asymmetric structures can be useful, for example, in forming blazed diffraction gratings. Asymmetric structures can be obtained by creating an asymmetric temperature profile (e.g., by canting the substrate surface relative to the interference pattern), by controlling the direction of material deposition (e.g., by physical vapor deposition of material using a collimated beam directed at the substrate at an off-normal axis), by post-deposition steps such as etching or shadow coat deposition, or by other suitable methods.

While the present invention is concerned primarily with temperature-dependent deposition of material according to a surface temperature profile that corresponds to an electromagnetic interference pattern, the same interference patterns used to preferentially heat substrates can also be used to pattern photoresist layers without using a mask. For example, wire grid polarizers and/or reflectors can be made in the following manner. A substrate can be coated with a layer of material, such as a metal, suitable for forming the wire grid device. A photoresist layer can then be coated on the metal or other layer. The photoresist can then be exposed to an interference pattern in any suitable manner as described above. The photoresist can then be developed to expose areas of the underlying layer coincident with the interference pattern. The exposed portions of the underlying layer can then be etched and the remaining photoresist removed to leave a wire grid polarizer or reflector on the substrate. In an analogous manner, wire grids can also be formed using the photoresist as a deposition mask rather than as an etch mask. As discussed above, multiple interference patterns from one or more radiation sources can be used to simultaneously or serially expose the photoresist so that superimposed patterns may be formed upon etching of the underlying layer after patterning.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of making a wire grid visible light polarizer and infrared reflector comprising the steps of:

directing a first electromagnetic interference pattern comprising a series of parallel fringes spaced no more than 100 nm apart onto a substrate surface to preferentially heat selected portions of the substrate surface according to the first interference pattern;

selectively depositing a first conductive material on the substrate surface according to the first interference pattern by exposing the substrate to the first conductive material in the gas phase, the first material capable of preferentially accumulating as a function of surface temperature;

directing a second electromagnetic interference pattern comprising a grid pattern having spacings of no less than 200 nm onto a substrate surface to preferentially heat selected portions of the substrate surface according to the second interference pattern; and selectively depositing a second conductive material on the substrate surface according to the second interference pattern by exposing the substrate to the second conductive material in the gas phase, the second material capable of preferentially accumulating as a function of surface temperature.

2. A method for preferentially depositing material on a substrate surface to make a wire grid optical element comprising the steps of:

directing an electromagnetic interference pattern onto the substrate surface to preferentially heat selected portions of the substrate surface according to the interference and pattern, the interference pattern comprising two or more superimposed sub-patterns, one of the superimposed sub-patterns comprising a series of parallel fringes having an average fringe spacing that is no more than about 100 nm, and another of the superimposed sub-patterns comprising a grid pattern having an average grid line spacing that is no less than 200 nm; and selectively depositing conductive material on the substrate surface according to the interference pattern by exposing the substrate to the conductive material in the gas phase, the material capable of preferentially accumulating as a function of surface temperature.

3. A method for preferentially depositing material on a substrate surface to make a wire grid optical element comprising the steps of:

directing an electromagnetic interference pattern onto the substrate surface to preferentially heat selected portions of the substrate surface according to the interference pattern;

selectively depositing an insulating material according to the interference pattern by exposing the substrate to the insulating material in the gas phase, the material capable of preferentially accumulating as a function of surface temperature; and selectively depositing conductive material on the substrate surface according to the interference pattern by exposing the substrate to the conductive material in the gas phase, the material capable of preferentially accumulating as a function of surface temperature.

4. A method for preferentially depositing material on a substrate surface to make a wire grid optical element comprising the steps of:

directing an electromagnetic interference pattern onto the substrate surface to preferentially heat selected portions of the substrate surface according to the interference pattern;

selectively depositing conductive material on the substrate surface according to the interference pattern by exposing the substrate to the conductive material in the gas phase, the material capable of preferentially accumulating as a function of surface temperature; and etching a portion of the selectively deposited material.

* * * * *